United States Patent [19]
Jensen

[11] 4,062,347
[45] Dec. 13, 1977

[54] SOLAR HEATING SYSTEM

[75] Inventor: Ronald N. Jensen, Hampton, Va.

[73] Assignee: The United States of America as represented by the Administrator of the National Aeronautics and Space Administration, Washington, D.C.

[21] Appl. No.: 717,320

[22] Filed: Aug. 24, 1976

[51] Int. Cl.² ............................................. F24J 3/02
[52] U.S. Cl. ................................. 126/270; 126/400; 237/1 A
[58] Field of Search .................... 126/270, 271, 400; 237/1 A; 165/18

[56] References Cited

U.S. PATENT DOCUMENTS

| | | | |
|---|---|---|---|
| 2,559,869 | 7/1951 | Gay | 126/270 |
| 3,400,249 | 9/1968 | Mekjean et al. | 126/400 |
| 3,997,108 | 12/1976 | Mason | 126/270 |

Primary Examiner—Kenneth W. Sprague
Attorney, Agent, or Firm—Howard J. Osborn; Wallace J. Nelson; John R. Manning

[57] ABSTRACT

A system is disclosed for using solar energy to heat the interior of a structure. The system utilizes a low-cost solar collector to heat a recirculating air mass which then flows through a series of interconnected ducts and passageways without the use of exterior fans or blowers. Heat is transferred from the air mass to the structure's interior and the air mass is then reheated.

4 Claims, 2 Drawing Figures

SOLAR HEATING SYSTEM

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

This invention generally relates to devices using solar radiation, and more particularly to devices using solar energy to heat interior structures. The system described herein utilizes a recirculating air mass and a heat radiator to transfer solar energy from a heated air mass to the interior of a structure.

2. Description of the Prior Art

The uses of solar energy to heat the interior of structures is not new. United States Pat. No. 504,544 to Van Der Heyden, for example, teaches a simple iron tube coated with carbon black which is heated by solar radiation causing the air contained therein to rise and enter the interior of a room, thereby warming the room. Typical of house heating systems which may or may not use solar energy are those described in U.S. Pat. Nos. 2,559,869 and 2,559,870 issued to F. W. Gay. In both these patents, a system of ducts, dampers and air passages serve to circulate heated air throughout a house structure. Additionally, U.S. Pat. Nos. 3,299,589 and 3,450,192 both issued to H. R. Hay, also teach the use of solar radiation to modulate the temperature within an enclosure.

In addition, several structures have been built which utilize solar energy as a heat source. The "Solar One" house built at the University of Delaware uses solar radiation to heat air and a salt solution storage medium while a solar house designed in France uses vertical air collectors and pumps to direct air directly into the occupied space. The use of a radiation type ceiling is described in Chapter 8 of the ASHRAE Handbook, 1976 Systems.

While many features of house heating systems, and in particular, solar heating systems, have been known and described in the prior art, they have not been combined in a workable manner to provide an inexpensive and easy to maintain solar heating system for residential, commercial, agricultural and industrial buildings.

It is therefore an object of the present invention to provide an inexpensive and easy to maintain heating system for structures which use solar radiation.

A further object of the present invention is a solar heating system for structures which utilizes gravity flow to move the air, thereby eliminating the need for energy consuming blowers and fans.

A still further object of the present invention is a solar heating system having a recirculating air flow.

An additional object of the present invention is a solar heating system utilizing a radiator panel to transfer heat to the occupied area of a structure.

These and other objects of the invention will be more readily apparent when considered in reference to the following description and when taken in connection with the accompanying drawings.

SUMMARY OF THE INVENTION

According to the present invention, a solar collector is constructed on an exterior wall of a structure and serves to heat the air contained in a vertical passageway, causing that air to rise. By using a series of interconnected ducts, passageways, plenums, and dampers, the heated air is recirculated throughout the building. As the heated air flows through the building, heat is withdrawn from it and passes through a radiator into the interior of the structure which is thereby heated. The air flow is essentially due to the changing temperature of the air mass, thereby making the use of fans or blowers unnecessary.

DESCRIPTION OF THE PREFERRED EMBODIMENT

Figure 1:
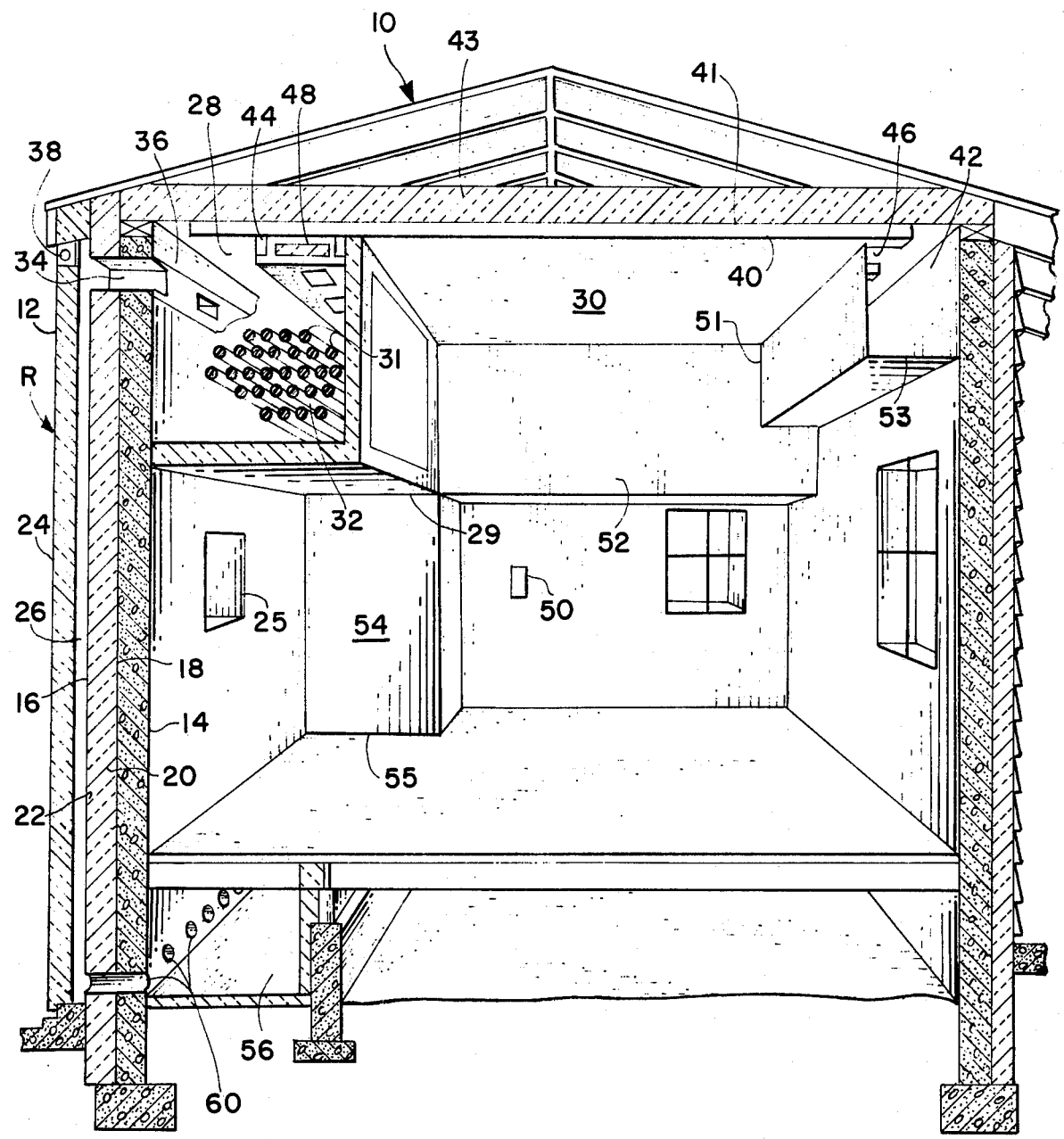
FIG. 1 is a perspective view of a structure partially cut away showing the solar heating system of present invention installed.

Referring now to the drawing, there is shown a preferred embodiment of the invention as it would be used to heat the interior of a simple, one-room structure of conventional construction. It will be readily apparent, however, to one of ordinary skill in the art that the present invention is capable of being used in more complex, multi-roomed structures, with only minor modifications.

As seen in FIG. 1, a solar collector 12 is fastened to wall 14 of structure 10. Wall 14 faces in a direction which will receive a maximum amount of solar energy, and for northern latitudes preferably faces south. Solar collector 12 may be any one of several types known in the art, however, the solar collector 12 used in the preferred embodiment and described below has been found to provide satisfactory operation at a low cost. The solar collector 12 of the preferred embodiment has an absorber plate 16 fastened in spaced relation to the outer face 18 of wall 14. Absorber plate 16 may be manufactured from any suitable material, such as fibrous sheathing board, which is colored or painted black to better absorb solar energy. Insulation 20 is placed in space 22 between absorber plate 16 and wall 14. The insulation 20 prevents heat loss through wall 14 and in the preferred embodiment is approximately a six inch layer of fiberglass matting.

Transparent facing 24 of solar collector 12 is fixedly positioned in spaced relation to abosrber plate 16, thereby creating vertical passageway 26. Transparent facing 24 may be manufactured from any suitable transparent material, such as Plexiglass, or conventional window glass which was used in the specific embodiment described herein.

Vertical passageway 26 is coextensive with outer face 18 of wall 14 and has a thickness which may be varied to suit a variety of design parameters. For the purposes of the preferred embodiment, it was found that a thickness of from four to six inches in vertical passageway 26 provided excellent results.

A solar window 25 is provided in wall 14 of structure 10 to minimize the concern of visibility when solar collectors use most of a wall surface. Window 25 consists of a layer of heat absorbing glass at the absorber plate 16 and two clear sheets of glass positioned towards the interior of wall 14.

Heat storage duct 28 is positioned adjacent to wall 14 and below ceiling 30 of structure 10. Contained within heat storage duct 28 is a conventional heat storage medium 32. Many suitable heat storage mediums 32 are known in the art. For example, common rocks or bricks may be used; however, the preferred embodiment utilizes a salt storage device in order to reduce the weight of the overall system. In the salt storage device, sodium carbonate dehydrate is mixed with water in a one-to-one volume ratio and placed in plastic pipes 31 which are then placed in the heat storage duct 28.

Inlet duct 34 provides an unobstructed opening connecting vertical passageway 26 with heat storage duct 28 which may be selectively opened or closed by heat damper 36. Heat damper 36 is regulated by collector thermostat 38 which is positioned so as to sense the temperature of the air contained in vertical passageway 26.

Radiator plenum 40 is positioned above ceiling 30 of structure 10. Ceiling 30 is manufactured of a material which will draw heat from the air and transmits it to the interior of structure 10. While various metals are suitable, ceiling 30 in the embodiment described herein was manufactured from Masonite. Masonite was used because it, being a wood product, is produced from a renewable resource. Radiator plenum 40 is coextensive with ceiling 30 of structure 10 and communicates with heat storage duct 28 through plenum opening 44 and with collector duct 42 through collector opening 46. Plenum opening 44 and collector opening 46 are at opposite ends of the interior area to be warmed. Top portion 41 of radiator plenum 40 has a backing of insulation 43 to prevent heat loss through the roof of structure 10. In the preferred embodiment, insulation 43 was a six inch thick layer of fiberglass.

Plenum opening 44 may be selectively blocked by plenum damper 48 which is activated by room thermostat 50. Room thermostat 50 senses the air temperature within the area to be heated.

Figure 2:
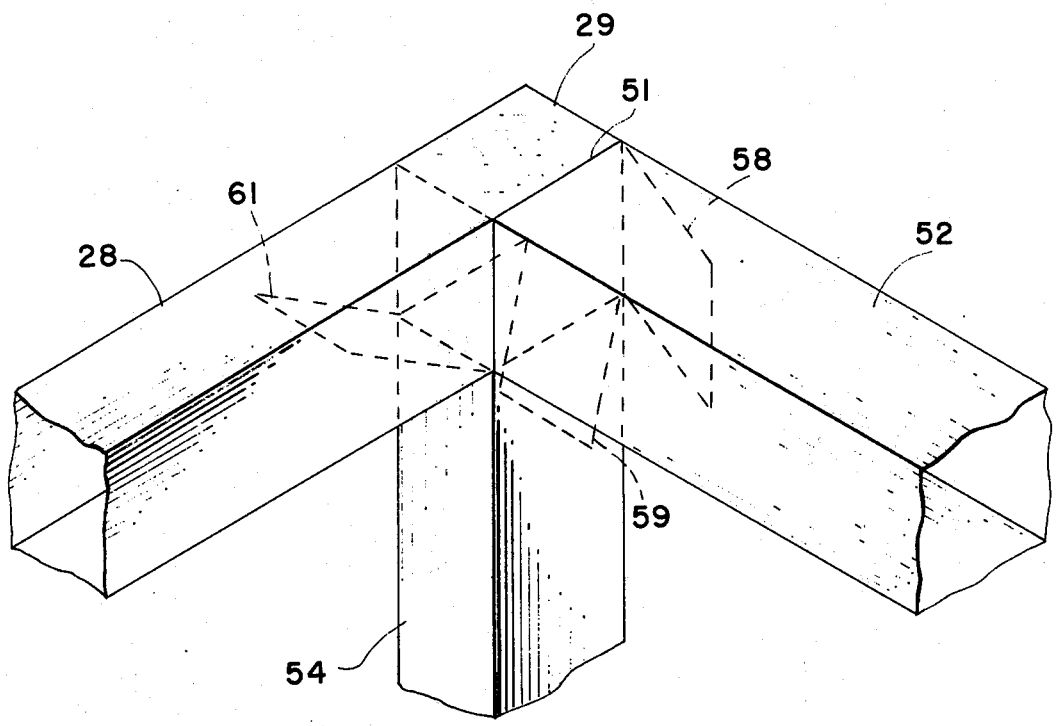
FIG. 2 is a partially cut away perspective view of a portion of the heating duct system shown in FIG. 1.

Collector duct 42 is closed at end 53 and communicates with the return duct 52 at end 51. Return duct 52 has a vertical portion 54 which is in open communication with feeder duct 56 at end 55. Referring briefly now to FIG. 2, return duct 52 also communicates with heat storage duct 28. Return damper 58 is positioned between return duct 52 and vertical portion 54 and is positioned to selectively block the interior of return duct 52. Vertical damper 59 is positioned to selectively block vertical portion 54 and end damper 61 is positioned to selectively block end 29 of heat storage duct 28. Return damper 58 and end damper 61 are activated by room thermostat 50 which senses the temperature in the area to be warmed while vertical damper 59 is activated by collector thermostat 38.

Feeder duct 56, shown in FIG. 1, is in open communication with vertical passageway 26 through feeder passages 60.

OPERATION

The normal operation of the present invention will now be described. Solar collector 12 receives solar energy R and transfers this energy in the form of heat to the air contained in vertical passage 26, causing it to rise. As the heated air rises in vertical passage 26, it passes through inlet duct 34 and into heat storage duct 28. As the heated air passes to heat storage duct 28, some of the heat contained in the air is transferred to the heat storage medium 32. However, in normal operation, the air containing most of the original heat passes through plenum opening 44 and into radiator plenum 40. As the heated air moves through radiator plenum 40 from plenum opening 44 to collector opening 46, heat is transferred first to ceiling 30 and then to the interior of structure 10. The transferred energy warms the interior of the structure 10. The cooler air, being moved toward collector opening 46, flows into collector duct 42. As the cooler air is forced along through collector duct 42, it eventually comes to return duct 52 and finally to vertical portion 54. The cooler air falls within vertical portion 54 until it comes to feeder duct 56. After reaching feeder duct 56, the air is available to move through feeder passage 60 back into vertical passage 26 where it is reheated and the cycle repeated.

When the interior portion of structure 10 reaches the desired temperature, room thermostat 50 activates plenum opening 44, end damper 61, and return damper 58. This prevents flow of the heated air into radiator plenum 40, prevents the air in return duct 52 from flowing into vertical portion 54 and also opens end 29 of heat storage duct 28, to thereby complete communication between heat storage duct 28 and vertical portion 54.

While the interior temperature of structure 10 is at the desired level, the air flow course is altered and the heated air rises in vertical passage 26 and passes into heat storage duct 28 where now most of the heat contained in the air is transferred to heat storage medium 32. As the air is cooled, it moves into vertical portion 54 where it falls into feeder duct 56 and is again available to move through feeder passage 60 into vertical passage 26 where it is reheated and the cycle repeated.

When solar energy is not available to heat the air in vertical passage 26, collector thermostat 38 activates heat damper 36 and vertical damper 59, thereby closing inlet duct 34 and vertical portion 54 respectively. While this situation exists, the air flow course is, again, altered. The air in heat storge duct 28 draws heat from the heat storage medium 32, rises and passes through plenum opening 44. The air then flows through radiator plenum 44 and into collector duct 42. From collector duct 42, the air moves through return duct 52 and back into heat storage duct 28 where the air again draws heat from heat storage medium 32 and repeats the cycle.

It will be understood that the foregoing description is of the preferred embodiment of the invention and is therefore merely representative. Obviously, there are many variations and modifications of the present invention in light of the above teachings. For example, a thin secondary absorber plate may be positioned in vertical passage 26 and spaced from absorber plate 16 to improve the heating capacity of solar collector 12. In use, the secondary absorber plate also absorbs solar radiation and imparts the absorbed energy to the air in vertical passage 26. Further, the air flow pattern can be modified to provide heat to all the rooms of a multi-roomed structure as by extending radiator plenum 40. It is, therefore, to be understood that within the scope of the appended claims, the invention may be practiced otherwise and as specifically described.

What is claimed is:

1. In a structure having a roof, an interior area and a wall which receives solar energy from the sun, a solar heating system comprising:
   a solar collector means enclosing a heat absorbing medium and including a transparent structural facing disposed in spaced relation with an absorber plate;

said solar collector means being affixed to the wall of the structure for receiving solar energy and for transferring said solar energy to said heat absorbing medium in the form of heat;

a heat storage plenum means for selectively absorbing heat from or transferring heat to said heat absorbing medium; said heat storage plenum means communicating with said solar collector thereby providing a first passage by which said heat absorbing medium can enter said heat storage means;

a radiator means having first and second opposed ends forming the ceiling of the interior area and communicating with said heat storage plenum means at said first opposed end for providing a second passage for said heat absorbing medium and for transferring heat from said heat absorbing medium to the interior area of the structure;

an insulation backing for said radiator means to prevent heat loss from said radiator only at the surface thereof opposite the exposed interior ceiling and disposed toward the roof;

a duct means communicating with said radiator means at said second opposed end for providing a third passage for said heat absorbing medium between said radiator means and said solar collector means and for providing a fourth passage for said heat absorbing medium between said radiator means and said heat storage plenum means;

said heat absorbing medium being completely enclosed and thus having a plurality of flow paths through said solar collector and said first, second, third and fourth passages; and a damper means for selectively altering said flow paths of said heat absorbing medium.

2. The solar heating system of claim 1 wherein said heat storage plenum means comprises a heat storage duct and a heat storage assembly and wherein said heat storage assembly comprises plastic pipes containing sodium carbonate dehydrate mixed with water in a one-to-one volume ratio.

3. The solar heating system of claim 2 wherein said duct means comprises:

a collector duct communicating with said radiator means at said second opposed end for receiving said heat absorbing medium from said radiator;

a return duct communicating with said collector duct for receiving said heat absorbing medium from said collector duct; said return duct also communicating with said heat storage duct;

a vertical portion communicating with said return duct for receiving said heat storage medium from said return duct; and a feeder duct interposed between said vertical portion and said solar collector means for providing a passage for said heat absorbing means between said vertical portion and said solar collector means.

4. The solar heating system of claim 3 wherein said damper means comprises:

a heat damper for selectively blocking said first passage;

a vertical damper for selectively blocking said vertical portion;

a collector thermostat for activating said heat damper and said vertical damper;

a return damper for selectively blocking said return duct;

an end damper for selectively blocking said fourth passage;

a plenum damper for selectively blocking said second passage; and a room thermostat for activating said return, end, and plenum dampers.

* * * * *